July 11, 1950  J. SKOPAL  2,514,591
PHOTOGRAPHIC TELEOBJECTIVE
Filed Sept. 3, 1947

INVENTOR  JAN SKOPAL
BY HIS ATTORNEY  Paul H. Smoller

Patented July 11, 1950

2,514,591

UNITED STATES PATENT OFFICE 2,514,591

PHOTOGRAPHIC TELEOBJECTIVE

Jan Skopal, Prerov, Czechoslovakia, assignor to Meopta, Consolidated Factories for Fine Mechanical and Optical Instruments, National Corporation, Prerov, Czechoslovakia Application September 3, 1947, Serial No. 771,832
In Czechoslovakia September 2, 1946

Section 1, Public Law 690, August 8, 1946
Patent expires September 2, 1966

1 Claim. (Cl. 88—57)

The present invention relates to a photographic tele-objective, wherein the spherical and chromatic defects, as well as the astigmatism and coma are corrected, the main image point of which is lying in front of the front surface of the first member and the two condensing members of which are enclosing the dispersing lens which latter is of a glass of a refraction index greater than 1.6, said lens being separated from said front member by a larger and from said rear member by a smaller air gap.

A tele-objective is already known having, in principle, the same elements as the above mentioned, the dispersing member of which was usually made of a glass having a refraction index greater than 1.60 and a small $\nu$ value, the focal distance of said dispersing member not exceeding $\tfrac{1}{10}$ and the focal distance of said second collecting member not exceeding $\tfrac{1}{10}$ of the total focal distance of the tele-objective, both said members forming the negative part of the tele-objective.

The object of the present invention is a tele-objective of a constitution similar in shape, but characterised in that the two cemented together lenses of the anterior condensing element are made from heavy glasses the refraction index of which exceeds 1.60, the focal distance of the first bi-convex lens of said element being within the limits of 30 to 40 p. cent of the total focal distance of the tele-objective and the first radius of said lens in the direction of the progressing rays being within the limits of 33 to 37 p. cent of the total focal distance of the tele-objective, the dispersing element being a simple lens of heavy crown glass the $\nu$ value of which is within the limits of 52 to 57 and that the third element is formed as a condensing lens of a glass having a smaller refraction index, but a greater $\nu$ value than the adjacent dispersing element.

By the arrangement according to this invention it is possible to obtain a tele-objective which with a comparatively high light power combines a smaller spherical aberration, a smaller field dishing and a smaller astigmatism and coma than other hitherto known tele-objectives of similar constitution.

Figure 1:
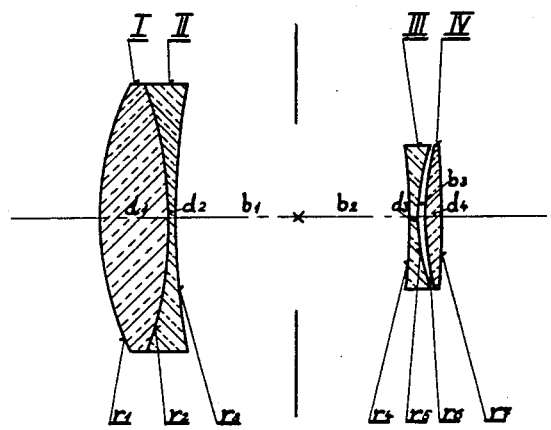
Figure 2:
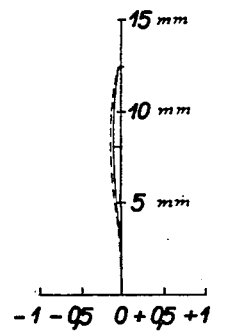
Figure 3:
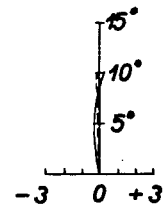
Figure 4:
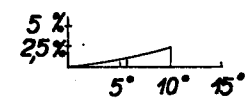

The accompanying drawing shows, by way of example only, in Fig. 1 a diagrammatic cross sectional view of an embodiment of a tele-objective according to this invention wherein $r$ indicates the radius of curvature, $d$ the thickness of the lens and $b$ the distance of the lenses. The types of glasses employed are determined by the index of refraction $n_D$ for the D line of the solar spectrum as well as by the $\nu$ value. The individual lenses are indicated I, II, III, and IV. The dimensions are given in millimeters. Fig. 2 illustrates the spherical aberration and deflection from the sine condition of the tele-objective according to the invention for a focal distance of 100 mm., Fig. 3 its astigmatism and Fig. 4 the distortion as determined according to N. v. Rohr's method.

*Example, Fig. 1*

[Relative aperture 1:4. Focal distance 100 mm.]

| | | | $n_D$ | $\nu$ |
|---|---|---|---|---|
| $r_1 = +30.95$ | $d_1 = 6.4$ | | | |
| $r_2 = -41.18$ | $d_2 = 1.0$ | I | 1.61765 | 55.1 |
| $r_3 = +1012.00$ | $b_1 = 12.25$ | II | 1.71736 | 29.5 |
| $r_4 = -63.58$ | $b_2 = 11.0$ | III | 1.63834 | 55.5 |
| $r_5 = +20.83$ | $d_3 = 0.8$ | | | |
| $r_6 = +28.58$ | $b_3 = 0.4$ | IV | 1.59551 | 39.2 |
| $r_7 = -98.57$ | $d_4 = 1.6$ | | | |

I claim:

An optical objective of the telephoto type corrected for spherical and chromatic aberrations, coma and astigmatism, whose principal points lie before the front of the objective, said optical objective comprising in combination three members in axial alignment, said three members being a front convergent meniscus doublet member consisting of a front convergent element compounded with a divergent element, each having a mean refractive index greater than 1.60; a rear convergent member; and a middle divergent member having a mean refraction index greater than 1.60 and being separated from the front member by a greater air space and from the rear member by a lesser air space; the front convergent element of said front convergent doublet member having a focal length of 30 to 40 percent of the equivalent focal length of the objective and the front surface of the front convergent doublet member having a radius of curvature between 30 and 37 percent of said equivalent focal length of the objective; the middle divergent member consisting of a simple lens made of dense crown glass having an Abbé-number between 52 and 57; and the said rear convergent member consisting of a simple lens made of a material having mean refractive index and Abbé-number less than the material of the middle divergent member.

JAN SKOPAL.

REFERENCES CITED

The following references are of record in the file of this patent:

UNITED STATES PATENTS

| Number | Name | Date |
|---|---|---|
| 1,156,743 | Booth | Oct. 12, 1915 |
| 1,202,021 | Bielicke | Oct. 24, 1916 |
| 2,239,538 | Richter | Apr. 22, 1941 |
| 2,354,503 | Cox | July 25, 1944 |
| 2,421,927 | Cox | June 10, 1947 |